(12) United States Patent
Trinelli et al.

(10) Patent No.: US 12,368,768 B1
(45) Date of Patent: Jul. 22, 2025

(54) HIGH SCALABILITY AND END-TO-END CONSISTENCY FOR WEB APPLICATIONS IN DISTRIBUTED ENVIRONMENTS

(71) Applicant: Cisco Technology, Inc., San Jose, CA (US)

(72) Inventors: Marco Trinelli, Lausanne (CH); Frank Brockners, Cologne (DE); Tamás Galló, Budapest (HU); Rafael Machado da Silva, Braga (PT); Trevor George Smith, Leatherhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/417,461

(22) Filed: Jan. 19, 2024

(51) Int. Cl.
  *G06F 15/173* (2006.01)
  *G06F 16/27* (2019.01)
  *H04L 67/02* (2022.01)

(52) U.S. Cl.
  CPC ............ *H04L 67/02* (2013.01); *G06F 16/278* (2019.01)

(58) Field of Classification Search
  None
  See application file for complete search history.

(56) References Cited

U.S. PATENT DOCUMENTS

| | | | | |
|---|---|---|---|---|
| 11,269,808 | B1* | 3/2022 | Yuan | G06F 16/172 |
| 12,218,777 | B2* | 2/2025 | Shribman | H04W 84/18 |
| 12,218,819 | B1* | 2/2025 | Georgalis | H04L 43/50 |
| 2014/0289391 | A1 | 9/2014 | Balaji et al. | |
| 2018/0082254 | A1 | 3/2018 | Shah et al. | |
| 2019/0245937 | A1 | 8/2019 | Nano et al. | |
| 2020/0218532 | A1* | 7/2020 | Hari Krishnan | H04L 67/75 |
| 2020/0226185 | A1* | 7/2020 | Yan | H04L 67/02 |
| 2020/0244638 | A1 | 7/2020 | Gupta et al. | |
| 2020/0252404 | A1* | 8/2020 | Padmanabhan | H04L 63/061 |
| 2021/0103582 | A1* | 4/2021 | Wentworth | G06F 16/2365 |
| 2021/0385292 | A1* | 12/2021 | Lowe | H04L 63/08 |

* cited by examiner

*Primary Examiner* — Phuoc H Nguyen
(74) *Attorney, Agent, or Firm* — Baker Botts L.L.P.

(57) ABSTRACT

In one embodiment, a method may use one or more Representational State Transfer (REST) Application Programming Interfaces (APIs) to receive data associated with a web application from a first user interface (UI) client device. The method may use the one or more REST APIs to determine a stateless operation by performing stateless pre-processing on the data associated with the web application and one or more contextual features associated with the stateless operation. The method may determine an augmented notification by applying an augmentation operation on the one or more contextual features and the stateless operation. The method may determine a stateful operation using the augmented notification. The method may receive a request for an update on the data associated with the web application from a second UI client device. In response to receiving the request, the method may communicate the stateful operation to the second UI client device.

20 Claims, 6 Drawing Sheets

FIG. 5

HIGH SCALABILITY AND END-TO-END CONSISTENCY FOR WEB APPLICATIONS IN DISTRIBUTED ENVIRONMENTS

TECHNICAL FIELD

The present disclosure relates generally to the field of communications, and, more particularly, to a system and method for achieving high scalability and end-to-end state consistency in a distributed environment.

BACKGROUND

A distributed network system, such as cloud computing and edge computing, delivers computing power and storage capacity as a service to a community of user devices via networks. Web applications and data are stored on a distributed environment server. Thus, a user interface (UI) client may access various web applications and data using client devices that store and execute a plurality of browser applications. As a result, networking architectures have dramatically scaled up and grown increasingly complex in communications environments to meet the needs of users. For example, millions of front-end UI clients may be connected to a back-end service in large web/cloud-managed edge computing. As another example, each of the front-end UI clients needs to present up-to-date information to the user device. Thus, a change that the front-end UI client makes to the distributed network system needs to be propagated quickly and consistently to all other connected UI clients. Trivial implementations, where all UI clients poll the back-end at very frequent intervals, lead to high load and scaling challenges on the back-end service due to a large amount of data moving across the distributed network system. In addition, the augmentation of UI clients or end users wishing to communicate in a distributed network environment has caused many networking configurations and systems to respond by adding elements to accommodate the increase in networking traffic.

In some embodiments, traditional methods may use basic implementations of pub/sub systems, such as Kafka, PNDA, and twitter, to update UI clients state. Kafka is an open-source platform for event distribution, logging, and streaming. PNDA is another example of an open source project that provides updates to clients using WebSocket connections via a dedicated microservice alongside a Representational State Transfer (REST) Application Programming Interface (API) provided to supply other data. Web-scale services, such as Twitter, use fan-out mechanisms to address read-heavy workloads at scale by generating client response data when the source data is known to have changed, but sacrifice e2e consistency to achieve this. Therefore, the traditional methods do not solve the problems associated with (a) system scalability and (b) e2e consistency.

DESCRIPTION OF EXAMPLE EMBODIMENTS

Overview

In one or more embodiments, an apparatus may include one or more processors, and one or more computer-readable non-transitory storage media coupled to one or more of the processors. The one or more computer-readable non-transitory storage media may include instructions operable when executed by one or more of the processors to cause one or more components of the apparatus to perform operations to use one or more Representational State Transfer (REST) Application Programming Interfaces (APIs) to receive data associated with a web application from a first UI client device. The apparatus is configured to use the one or more REST APIs to determine a stateless operation by performing stateless pre-processing on the data associated with the web application. The apparatus is configured to use the one or more REST APIs to determine one or more contextual features associated with the stateless operation. The apparatus is configured to use a notification service to determine an augmented notification by applying an augmentation operation on the one or more contextual features and the stateless operation. The apparatus is configured to use the notification service to determine a stateful operation using the augmented notification. The apparatus is configured to receive a request for an update on the data associated with the web application from a second UI client device. In response to receiving the request, the apparatus is configured to communicate the stateful operation to the second UI client device. The second UI client device may be the first UI client device.

In one or more embodiments, the apparatus is configured to use a back-end service to access data persisted in a database. The back-end service is implemented as microservices and scaled horizontally. The apparatus is configured to use the notification service to directly access the one or more REST APIs internally when multiple clients are connected to the apparatus. The apparatus is configured to use the notification service to apply a retry mechanism to return data when no errors occur in an event associated with the augmented notification received from an event bus and later processed. The retry mechanism includes a counter for the event that indicates a number of times the event has been delivered. The apparatus is configured to use the notification service to apply an ingress process to receive information associated with the one or more contextual features from the event bus. The apparatus is configured to use the notification service to acknowledge (ACK) the augmented notification when the augmented notification is successfully processed. The apparatus is configured to use the notification service to negatively acknowledge (NACK) the augmented notification when the augmented notification fails to be processed. The apparatus is configured to use the notification service to terminate (TERM) the augmented notification when the corresponding event associated with the augmented notification has been processed by the notification service more than a predetermined threshold. The apparatus is configured to use the notification service to communicate subsequent updates on the data associated with the web application to all connected client devices when the augmented notification is successfully processed.

In one or more embodiments, a method, by an apparatus, may use one or more REST APIs to receive data associated with a web application from a first UI client device. The method may use the one or more REST APIs to determine a stateless operation by performing stateless pre-processing on the data associated with the web application. The method may use the one or more REST APIs to determine one or more contextual features associated with the stateless operation. The method may use a notification service to determine an augmented notification by applying an augmentation operation on the one or more contextual features and the stateless operation. The method may use the notification service to determine a stateful operation using the augmented notification. The method may receive a request for an update on the data associated with the web application from a second UI client device. In response to receiving the request, the method may communicate the stateful operation to the second UI client device. The second UI client device may be the first UI client device.

In one or more embodiments, the method may use a back-end service to access data persisted in a database. The back-end service is implemented as microservices and scaled horizontally. The method may use the notification service to directly access the one or more REST APIs internally when multiple clients are connected to the apparatus. The method may use the notification service to apply a retry mechanism to return data when no errors occur in an event associated with the augmented notification received from an event bus and later processed. The retry mechanism includes a counter for the event that indicates a number of times the event has been delivered. The method may use the notification service to apply an ingress process to receive information associated with the one or more contextual features from the event bus. The method may use the notification service to acknowledge (ACK) the augmented notification when the augmented notification is successfully processed. The method may use the notification service to negatively acknowledge (NACK) the augmented notification when the augmented notification fails to be processed. The method may use the notification service to terminate (TERM) the augmented notification when the corresponding event associated with the augmented notification has been processed by the notification service more than a predetermined threshold. The method may use the notification service to communicate subsequent updates on the data associated with the web application to all connected client devices when the augmented notification is successfully processed.

In one or more embodiments, one or more computer-readable non-transitory storage media may embody instructions that, when executed by a processor, cause the processor to perform operations to use one or more REST APIs to receive data associated with a web application from a first UI client device. The instructions, when executed by a processor, may cause the processor to perform operations to use the one or more REST APIs to determine a stateless operation by performing stateless pre-processing on the data associated with the web application. The instructions, when executed by a processor, may cause the processor to perform operations to use the one or more REST APIs to determine one or more contextual features associated with the stateless operation. The instructions, when executed by a processor, may cause the processor to perform operations to use a notification service to determine an augmented notification by applying an augmentation operation on the one or more contextual features and the stateless operation. The instructions, when executed by a processor, may cause the processor to perform operations to use the notification service to determine a stateful operation using the augmented notification. The instructions, when executed by a processor, may cause the processor to perform operations to receive a request for an update on the data associated with the web application from a second UI client device. In response to receiving the request, the instructions, when executed by a processor, may cause the processor to perform operations to communicate the stateful operation to the second UI client device. The second UI client device may be the first UI client device.

Technical advantages of certain embodiments of this disclosure may include one or more of the following. Certain apparatuses and methods described herein may determine an augmented notification service control system that separates stateless and stateful operations for massively scalable web applications in distributed environments. Certain embodiments may provide one or more mechanisms to effectively share the client states in an acknowledgement array across different replicas in order to scale horizontally the notification service. In particular, the notification service knows who the UI clients are currently connected via Websockets, Hypertext Transfer Protocol (http) long pooling, etc. However, a REST API server does not know which UI clients are active, inactive, or offline in using their APIs. The notification service manager may independently scale the operations of a backend service from a plurality of UI clients. For example, a notification service manager is used for stateful operations while backend services expose REST APIs are stateless. Thus, the notification service manager may separate the two results to an out-of-the-box scaling for the stateless backend services, and in general an easier scaling for the notification service, having only some client-related state to share across the replicas. As a result, the apparatus and the method may use the augmented notification service control system to reduce the number of API calls to the backend services. Certain embodiments may provide a retry mechanism based on acknowledgements managed either by the augmented notification service control system or driven by individual UI clients to ensure end-to-end consistence between front-end and back-end.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

It is desired to develop an augmented notification service control method and system to implement a massively scalable and reactive web application within a distributed system. The augmented notification service control method is critical to achieve high scalability and end-to-end consistency for massively scalable web applications with millions of front-end clients. Traditional web application system usually implement a framework which separates the client, such as user interface or front-end, from a back-end service, by exposing various operations of persistent storage, such as create, read, update, and delete (CRUD), on a database using one or more REST APIs. The various operations may facilitate viewing, searching, and changing information using computer-based forms and reports. While the user interface may need some state for the client and updates a corresponding state whenever the model in the database changes, the one or more REST APIs need to be stateless. Traditional web application methods may implement a computer communications protocol, such as WebSocket APIs, which provides a thin transport layer of persistent bidirectional communication channels over a single Transmission Control Protocol (TCP) connection between the back-end service and the client to update the state for the client. Furthermore, traditional web application methods may implement a long polling service in which the back-end service elects to hold a client connection open for as long as possible, and delivers a response when new data becomes available or if a timeout threshold is reached. However, it is challenging to implement traditional web application methods in a distributed environment to achieve consistency and robustness across all microservices. Traditional web application methods requires the back-end service to be stateful, which complicates the implementation with various issue associated with resources, latency, security, and scalability, etc. For example, Kubernetes may prioritize availability over consistency based on the CAP theorem. As a result, traditional web application methods often cause microservices, such as user interface or front-end, being in an inconsistent state, displaying incorrect or outdated data. As another example, traditional web application methods need various architectures and associated infrastructure defined to optimally support wireless and wireline networks when service providers increasingly move towards fixed-mobile convergence.

In some embodiments, the augmented notification service control method may be configured to use one or more REST APIs to receive data associated with a web application from a first UI client device. The first UI client device may be an internet of things (IoT) client device within the distributed environment. In particular, the augmented notification service method may use a notification service manager to separate stateful and stateless portions of the interaction between front-end and back-end web applications into two different procedures: 1) stateless REST APIs for all stateless interactions and 2) augmented notification services (ANS) for the stateful part of the interaction. For example, the stateful part may be scaled by augmenting a notification with all the information a client requires. In particular, the notification service manager may use the one or more REST APIs to determine one or more contextual features associated with the stateless operation. Thus, the notification service manager may determine an augmented notification by applying an augmentation operation on the one or more contextual features and the stateless operation. As a result, the augmented notification service control method may dramatically reduce subsequent API calls to retrieve context for a notification for the distributed system which deals with a large number of web clients connecting to a back-end service.

In some embodiments, the notification service manager may be configured to apply an acknowledge mechanism to determine acknowledgements (ACKs) of exchanged notifications to keep the front-end and back-end web applications in sync in order to achieve end-to-end state consistency between each front-end and back-end. In particular, the notification service manager is configured to subscribe to a second UI client device for all supported events in a bus. The second UI client device may be another IoT client device within the distributed system. For example, the notification service manager is configured to acknowledge the augmented notification when the augmented notification is successfully processed. As another example, the notification service manager is configured to negatively acknowledge the augmented notification when the augmented notification fails to be processed. As another example, the notification service manager is configured to terminate the augmented notification when the augmented notification is discarded by an associated UI client device. In particular, the notification service manager may apply a retry mechanism based on acknowledgements to keep the state of clients that have correctly processed a message and work alongside the event bus retention policy to discard old events.

Furthermore, the notification service manager may be configured to interact with individual clients, such as reconnecting clients, to apply the acknowledge mechanism to determine the acknowledgements of exchanged notifications to keep the front-end and back-end web applications in sync in order to achieve end-to-end state consistency between each front-end and back-end. In particular, a typical scenario is that browsers implement power saving mechanisms for tabs in the background by disconnecting WebSockets and long polling transports. As a result, the notification service manager may implement multiple replicas to scale horizontally to distribute the state of acknowledges of exchanged notifications, such as a distributed hash table (DHT) across all replicas.

Figure 1:
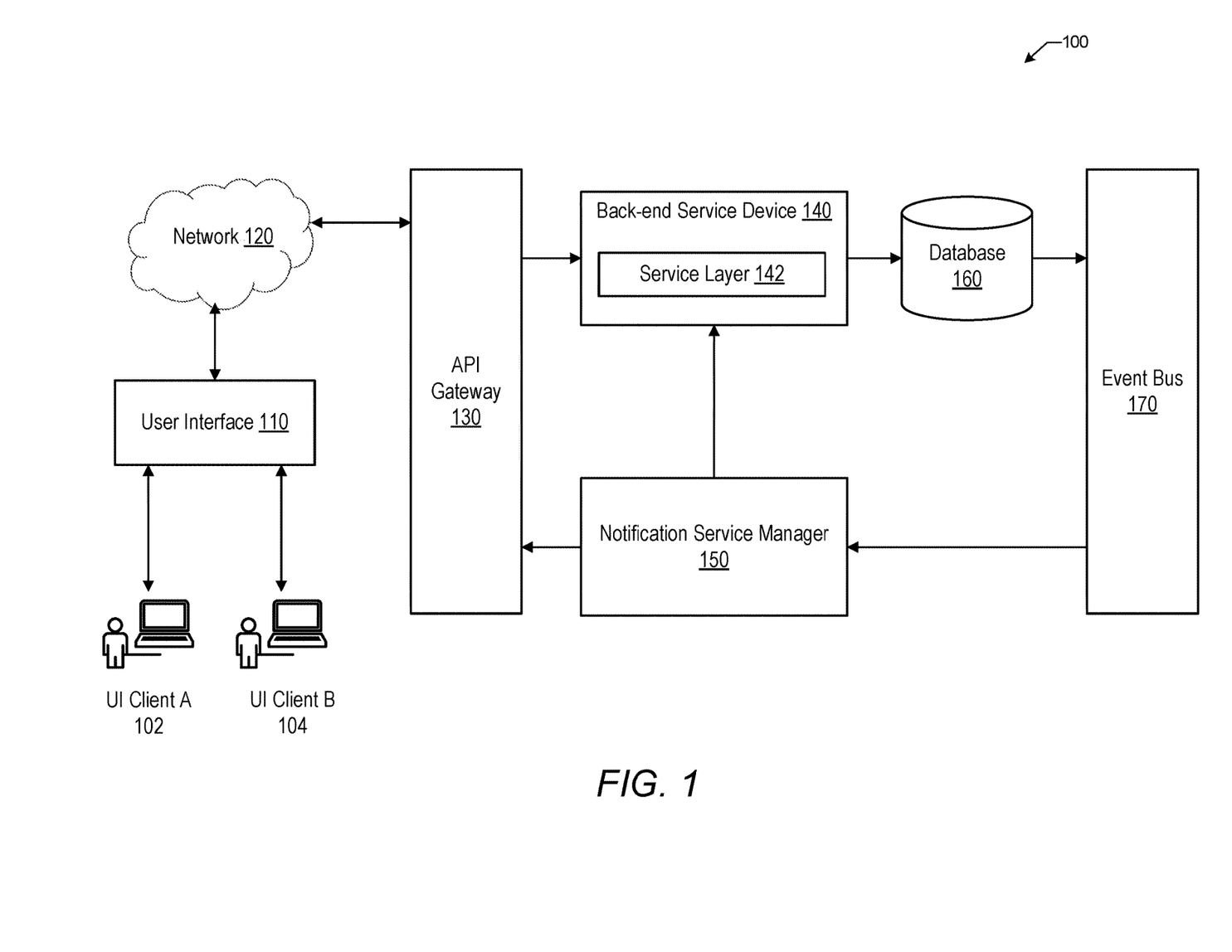
FIG. 1 illustrates an example augmented notification service system for use in a product.

FIG. 1 illustrates an example augmented notification service system 100 for use in a product. In an embodiment, augmented notification service system 100 may include UI 110, network 120, API gateway 130, back-end service device 140, notification service manager 150, database 160, and event bus 170. UI 110 may be communicatively coupled to a first UI client device associated with UI client A 102, to receive data associated with a web application using one or more first REST API calls. Likewise. UI 110 may be communicatively coupled to a second UI client device associated with UI client B 104, to query back-end service device 140 to obtain a full object of an augmented notification for the data associated with the web application using one or more second REST API calls. The augmented notification may include basic information from a stateless operation by performing stateless pre-processing on the data associated with the web application and one or more contextual features associated with the stateless operation using business logic events that are published in a database layer, such as database 160.

In an embodiment, UI 110 may be communicatively coupled to network 120 to use back-end service device 140 and notification service manager 150 via API gateway 130 to exchange information or get a current snapshot of the data. Network 120 broadly represents any wireline or wireless network, using any of satellite or terrestrial network links, such as public or private cloud on the Internet, local area networks (LANs), metropolitan area networks (MANs), wide area networks (WANs), a public switched telephone network (PSTN), campus network, internetworks, or combinations thereof. The network 120 may include or comprise the public internet and networked server computers that implement Web2 and/or Web3 technologies. Network 120 may comprise or support intranets, extranets, or virtual private networks (VPNs). Network 120 may also comprise a public switched telephone network (PSTN) using digital switches and call forwarding gear. Network 120 may also comprise a public switched telephone network (PSTN) using digital switches and call forwarding gear.

In an embodiment, API gateway 130 may be configured to implement network policy and configuration management for networks 120, such as a public cloud environment, by taking API calls from clients and then routing them to one or more microservices with request routing, composition, and protocol translation. API gateway 130 may be a data plane entry point for API calls that represent client requests to target web applications and microservices. API gateway 130 may be coupled to back-end service device 140, database 160, event bus 170, and notification service manager 150 to generate a new REST API by specifying a plurality of parameters for the new REST API, such as a name, security settings, throttling parameters, and cache settings. Likewise, API gateway 130 may be configured to manage an existing REST API to be modified or accessible to client applications. In particular, API gateway 130 may be configured to perform request processing based on defined polices, such as authentication, authorization, validation, access control, secure sockets layer and transport layer security (SSL/TLS), routing, and load balancing by creating and publishing web application programming interfaces, enforcing usage polices, controlling accesses, nurturing the subscriber community, collecting and analyzing usage statistics, and reporting on performance. For example, API gateway 130 may receive an API request from the first UI client device associated with UI client A 102. As another example, API gateway 130 may process the API request based on contents of the API request. As another example, API gateway 130 may send the processed API request to the public cloud environment. In particular, API gateway 130 may intercept the API request, such as run instance/create instance, and based on information in the API request, such as an identifier (ID) and date of birth of UI client A 102, correlate with metadata tags pre-configured by a second client device associated with UI client B 104 to determine the classless inter-domain routing (CIDR) from which to allocate an IP address.

In some embodiments, back-end service device 140 may be configured to implement a stateless, REST-compliant service for data management, file management, user management, and device management, etc. Back-end service device 140 may be connected to a plurality of UI client devices via network 120 to provide services to the plurality of UI client devices via network 120. Back-end service device 140 may receive an access request for the stateless, REST-compliant service from one of the plurality of UI client devices associated with multiple UI clients, such as UI client A 102. In response to the access request, the back-end service may use one or more REST APIs to receive data associated with a web application from a first UI client device associated with UI client A 102. The access request may be communicated in a message format native to the plurality of UI client devices and non-native to back-end service device 140. Back-end service device 140 may automatically convert the access request into a REST API call. Upon receipt of the REST API call, back-end service device 140 may provide the REST-compliant service. For example, back-end service device 140 may using the one or more REST APIs to determine a stateless operation by performing stateless pre-processing on the data associated with the web application. In particular, back-end service device 140 may include service layer 142 to determine one or more contextual features associated with the stateless operation. As another example, back-end service device 140 may access data persisted in database 160 and expose various CRUD operations on database 160 via REST APIs. The REST defines a software architecture to create stateless, reliable web applications for internet-scale usage in which the coupling between a client and back-end service device 140 is loose for large-scale application. Thus, back-end service device 140 may be scaled horizontally to allow a large number of components and interactions between components. Furthermore, back-end service device 140 may implement a stateless protocol in which no session information is retained by the receiver, such as back-end service device 140. Every packet of information transferred sent to the receiver may be understood in isolation, without context information from previous packets in the session. Each REST API call contains all of the data necessary to complete itself successfully. Therefore, back-end service device 140 may complete every client request independently of all previous requests and clients may request data in any order. As a result, back-end service device 140 may use the stateless, REST-compliant service to increase volume of web applications and improve performance by removing server load caused by retention of session information.

In some embodiments, event bus 170 may be configured to propagate data updates, such as from various CRUD operations, across all microservices in augmented notification service system 100. For example, event bus 170 may be a middleware component that implements NATS JetStream or Kafka to facilitate the exchange of messages or events between publishers and subscribers in the distributed system. For example, event bus 170 may receive an event from a source, such as back-end service device 140, and route the event to a destination, such as notification service manager 150, across all microservices of augmented notification service system 100 by evaluating the event against all rules of event bus 170 back-end. In particular, event bus 170 may include an event delivery object and a transport layer. The event delivery object delivers events between local subsystems on the same server. The transport layer delivers events to remote subsystems on a different server. Event bus 170 may use a transport mechanism, such as Transmission Control Protocol/Internet Protocol (TCP/IP), User Datagram Protocol/Internet Protocol (UDP/IP), Hypertext Transfer Protocol (HTTP), Ethernet or any other network transport protocol, associated with the event delivery object to transmit or receive events to or from the local or remote subsystems. Thus, event bus 170 provides a mechanism to enable real-time independent communication between different components of the distributed system. A component may send an event to event bus 170 without knowing who will pick up the event or how many others will pick it up. Likewise, another component may listen to an event on event bus 170 without knowing who send the event.

In some embodiments, notification service manager 150 may be configured to implement a stateful augmenting notification service which uses acknowledgements to exchanged notifications to achieve end-to-end state consistency between each front-end and back-end. Rather than passing basic information to the front-end, notification service manager 150 may augment each notification with additional context which is determined in a service layer in back-end service device 140. For example, the back-end service may receive an API request from UI client A 102 via a first UI client device to create a new object, such as a person with name "John Smith" and Date of Birth of "Jul. 8, 1990." Upon receipt of the API request from UI client A 102, back-end service device 140 may determine one or more contextual features, such as an age of 32 for the person, at service layer 142 and create the new object associated with the API request. Database 160 may publish an event associated with the new object with a particular identifier, such as "ID: 550e8400-e29b." Notifications associated with the event typically contain only very basic information with the particular identifier without the age information for the person in business logic determined at the service layer of back-end service device 140.

Furthermore, notification service manager 150 may be configured to determine an augmented notification by applying an augmentation operation on the one or more contextual features and the stateless operation. In particular, notification service manager 150 may subscribe to all data changes in event bus 170 for the event in order to send updates to multiple UI clients. For example, notification service manager 150 may implement an ingress process to receive data from event bus 170 or API 340 (referring to FIG. 3A). Notification service manager 150 may use the one or more REST APIs to directly access back-end service device 140. For example, notification service manager 150 may send a request to back-end service device 140 to obtain the one or more contextual features associated with the event based on the particular identifier of the event. Notification service manager 150 may determine an augmented notification by augmenting the notification associated with the event with the one or more contextual features and the stateless operation. As a result, notification service manager 150 may determine a stateful operation using the augmented notification and send a current snapshot of the data associated with the web application to a second UI client, such UI client B 104, who requests an update on the data associated with the web application from a second UI client device. Without augmentation, each UI client may need to query back-end service device 140 to get the full object including the one or more contextual features for the data associated with the web application. For example, N UI clients may need to submit N queries to get the data updates associated with the web application. However, notification service manager 150 may implement the internal augmentation to use only one query to get data updates for all UI clients. Therefore, notification service manager 150 may speed up operations when multiple UI clients are connected by dramatically reducing API calls from the multiple UI clients in multi-client and multi-tenant environments.

In operation, augmented notification service system 100 uses one or more REST APIs 340 (referring to FIG. 3A) to receive data associated with a web application from a first user interface (UI) client device, such as UI client A 102. Upon receiving the data associated with the web application, augmented notification service system 100 uses the one or more REST APIs 340 (referring to FIG. 3A) to determine a stateless operation by performing stateless pre-processing on the data associated with the web application. Augmented notification service system 100 uses the one or more REST APIs 340 (referring to FIG. 3A) to determine one or more contextual features associated with the stateless operation. In particular, augmented notification service system 100 uses a back-end service device 140 to access data persisted in database 160. The back-end service device 140 is implemented as microservices and scaled horizontally. Augmented notification service system 100 uses notification service manager 150 to determine an augmented notification by applying an augmentation operation on the one or more contextual features and the stateless operation. The augmented notification comprises basic information from the stateless operation and the one or more contextual features associated with the stateless operation using business logic events that are determined in service layer 142 and published in database 160. Augmented notification service system 100 uses notification service manager 150 to determine a stateful operation using the augmented notification.

Augmented notification service system 100 receives a request for an update on the data associated with the web application from a second UI client device, such as UI client B 104. In response to receiving the request, notification service manager 150 communicates the stateful operation to the second UI client device. Notification service manager 150 directly accesses the one or more REST APIs 340 (referring to FIG. 3A) internally when multiple clients are connected to the apparatus. Thus, notification service manager 150 subscribes to the second UI client device in order to communicate subsequent updates on the data associated with the web application to the second client device. For example, notification service manager 150 applies a retry mechanism to return data when no errors occur in an event associated with the augmented notification received from event bus 170. The retry mechanism includes a counter for the event that indicates a number of times the event has been delivered. As another example, notification service manager 150 applies an ingress process to receive information associated with the one or more contextual features from event bus 170.

Notification service manager 150 acknowledges the augmented notification when the augmented notification is successfully processed. Notification service manager 150 negatively acknowledges the augmented notification when the augmented notification fails to be processed. Notification service manager 150 terminates the augmented notification when the augmented notification is discarded by an associated UI client device.

Although FIG. 1 illustrates a particular number of UI clients 102 and 104, UIs 110, networks 120, API gateways 130, back-end service devices 140, service layers 142, notification service managers 150, databases 160, and event buses 170, this disclosure contemplates any suitable number of UI clients 102 and 104, UIs 110, networks 120, API gateways 130, back-end service devices 140, service layers 142, notification service managers 150, databases 160, and event buses 170. For example, FIG. 1 may include more than one notification service manager 150. As another example, FIG. 1 may include more or less than two UI Clients.

Although FIG. 1 illustrates a particular arrangement of UI clients 102 and 104, UI 110, network 120, API gateway 130, back-end service device 140, service layer 142, notification service manager 150, database 160, and event bus 170, this disclosure contemplates any suitable arrangement of UI clients 102 and 104, UI 110, network 120, API gateway 130, back-end service device 140, service layer 142, notification service manager 150, database 160, and event bus 170.

Although FIG. 1 describes and illustrates particular components, devices, or systems carrying out particular actions, this disclosure contemplates any suitable combination of any suitable components, devices, or systems carrying out any suitable actions. For example, augmented notification service system 100 may perform one or more actions of notification service manager 150.

Figure 2:
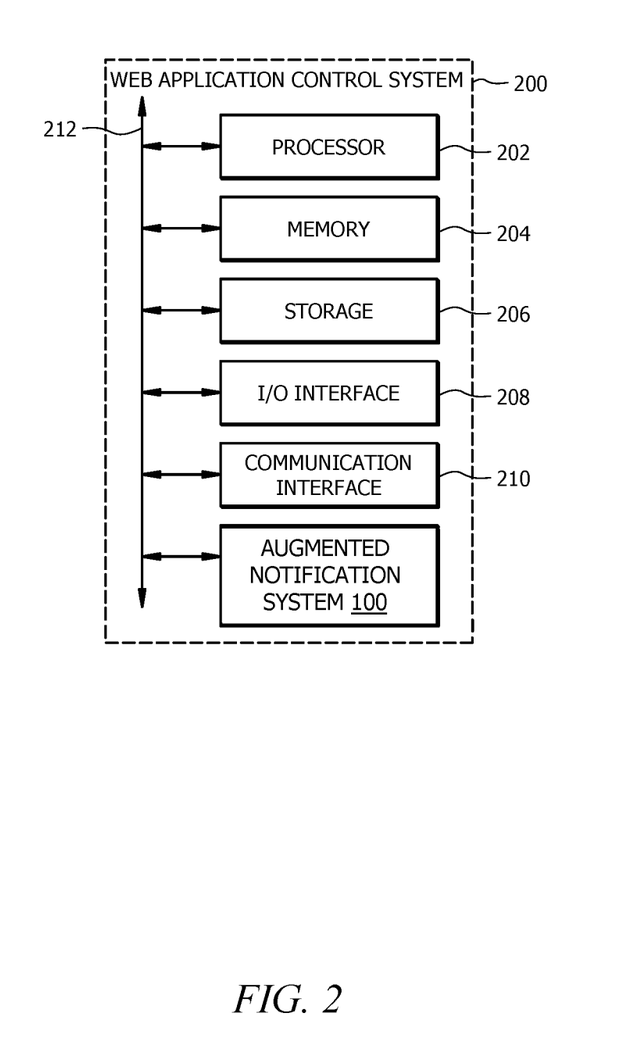
FIG. 2 illustrates an example web application control system.

FIG. 2 illustrates an example web application control system 200. In particular embodiments, one or more web application control systems 200 perform one or more steps of one or more methods described or illustrated herein. In particular embodiments, one or more web application control systems 200 provide functionality described or illustrated herein. In particular embodiments, software running on one or more web application control systems 200 performs one or more steps of one or more methods described or illustrated herein or provides functionality described or illustrated herein. Particular embodiments include one or more portions of one or more web application control systems 200. Herein, reference to an information handling system may encompass a computer or a computing device, and vice versa, where appropriate. Moreover, reference to an information handling system may encompass one or more computer systems, where appropriate. Further, the augmented notification service system 100 in FIG. 1 may be incorporated into the illustrated web application control system 200. With reference to the present disclosure, web application control system 200 may be the aforementioned product incorporating augmented notification service system 100, as described above with respect to FIG. 1. As such, "product" and "web application control system 200" may herein be used interchangeably.

This disclosure contemplates any suitable number of web application control systems 200. This disclosure contemplates web application control system 200 taking any suitable physical form. As example and not by way of limitation, web application control system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, web application control system 200 may include one or more web application control systems 200; be unitary or distributed; span multiple locations; span multiple machines; span multiple data centers; or reside in a cloud, which may include one or more cloud components in one or more networks. Where appropriate, one or more web application control systems 200 may perform without substantial spatial or temporal limitation one or more steps of one or more methods described or illustrated herein. As an example and not by way of limitation, one or more web application control systems 200 may perform in real time or in batch mode one or more steps of one or more methods described or illustrated herein. One or more web application control systems 200 may perform at different times or at different locations one or more steps of one or more methods described or illustrated herein, where appropriate.

In particular embodiments, web application control system 200 includes a processor 202, memory 204, storage 206, an input/output (I/O) interface 208, a communication interface 210, and a bus 212. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, web application control system 200 may load instructions from storage 206 or another source (such as, for example, another web application control system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to web application control system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between web application control system 200 and one or more I/O devices. Web application control system 200 may include one or more of these I/O devices, where appropriate. One or more of these I/O devices may enable communication between a person and web application control system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between web application control system 200 and one or more other web application control systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, web application control system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, web application control system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Web application control system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of web application control system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, web application control system 200 may be configured to initiate an augmented notification process (see FIG. 3A) in order to present up-to-date information to a client. In an embodiment, web application control system 200 may be configured to use or more REST APIs to receive data associated with a web application from a first user interface (UI) client device within a distributed environment. In an embodiment, web application control system 200 may be configured to use the one or more REST APIs to determine a stateless operation by performing stateless pre-processing on the data associated with the web application. In an embodiment, web application control system 200 may be configured to use the one or more REST APIs to determine one or more contextual features associated with the stateless operation. In an embodiment, web application control system 200 may be configured to determine an augmented notification by applying an augmentation operation on the one or more contextual features and the stateless operation. In an embodiment, web application control system 200 may be configured to determine a stateful operation using the augmented notification. In an embodiment, web application control system 200 may be configured to receive a request for an update on the data associated with the web application from a second UI client device. In response to receiving the request, web application control system 200 may be configured to communicate the stateful operation to the second UI client device by subscribing all data changes to send updates to the second UI client device.

Figure 3A:
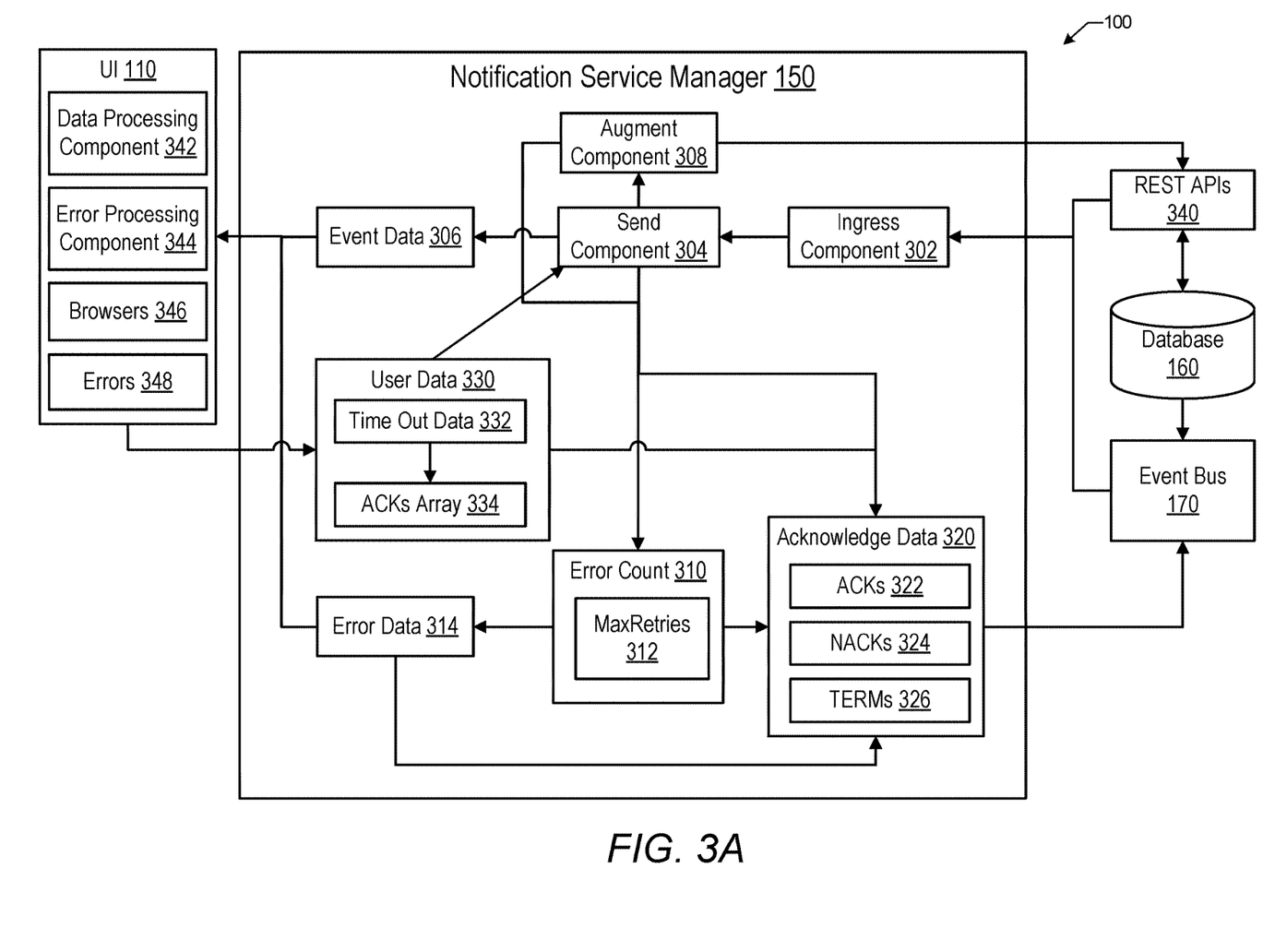
FIG. 3A illustrates an example notification service manager of an augmented notification service system.

FIG. 3A illustrates an example notification service manager 150 of an augmented notification service system 100. Notification service manager 150 is configured to implement a notification mechanism to keep back-end service device 140 (referring to FIG. 1) stateless and allow back-end service device 140 (referring to FIG. 1) to be implemented as microservices and scaled horizontally in a distributed environment. Augmented notification service system 100 may implement ingress component 302 to use internal API services, such as REST APIs 340, to receive data associated with a web application from a first UI client. The data associated with the web application may be persisted in database 160 and accessed by back-end service device 140 (referring to FIG. 1). Augmented notification service system 100 may update the data based on a request from a reconnecting UI client by exposing one or more CRUD operations on the data associated with the web application in database 160. For example, augmented notification service system 100 may use the REST APIs 340 to receive a request from the first UI client to create a new object for a person with name "John Smith" and Date of Birth of "Jul. 8, 1990." Thus, augmented notification service system 100 may determine a stateless operation to create a new object event with a particular identifier, such as "ID: 550e8400-e29b," by performing stateless pre-processing on the data associated with web application in database 160. The new object event may be published via database 160. Augmented notification service system 100 may use REST APIs 340 to determine one or more contextual features, such as age of the person, associated with the one or more stateless operation in service layer 142 (referring to FIG. 1) of back-end service device 140 (referring to FIG. 1). As a result, augmented notification service system 100 may store the new object event in event bus 170 and propagate the data updates across all microservices in the system.

In some embodiments, notification service manager 150 may be configured to subscribe to all supported events in event bus 170. Notification service manager 150 may implement ingress component 302 to receive a notification which is triggered whenever any data change occurs in event bus 170. The notification may be triggered based on a plurality of properties of an event, such as a stateless operation which is created in interactions between the front-end web application via UI 110, and the back-end service via back-end service device 140 (referring to FIG. 1). For example, the plurality of properties may include ID, description, name, date of birth, etc. As another example, the notification may contain basic information associated with the raw event. Notification service manager 150 may implemented send component 304 to pass the raw event, such as event data 306, to a second UI client via UI 110 without augmentation when the second UI client sends a request to query back-end service device 140 to get a current full object of the data associated with the web application. Thus, multiple UI clients, such as N UI clients, would need to send N queries to back-end service device 140 to return keys and values in the full object of the data associated with the web application.

In some embodiments, notification service manager 150 may implement ingress component 302 to receive the one or more contextual features associated with the stateless operation which is generated in service layer 142 (referring to FIG. 1) of back-end service device 140 (referring to FIG. 1). Notification service manager 150 may be configured to use augment component 308 to use internal REST APIs 340 to get more detailed information by accessing the one or more contextual features in service layer 142 (referring to FIG. 1) of back-end service device 140 and the event in database 160. Thus, notification service manager 150 may determine an augmented notification by applying an augmentation operation on the one or more contextual features and the stateless operation. Thus, notification service manager 150 may determine a stateful operation using the augmented notification to pass the event data with full object including business logic information, such as age of the person, to one or more UI clients. For multiple clients, notification service manager 150 needs one query to back-end service device 140 to return keys and values in the full object of the data associated with the web application. Therefore, notification service manager 150 may reduce API calls from the multiple clients in multi-client and multi-tenants environments. Likewise, notification service manager 150 may increase system scalability by reducing the number of interactions between front-end and back-end using internal augmentation 308 by directly accessing REST APIs 340 internally to speed up operations.

In some embodiments, notification service manager 150 may be configured to implement an acknowledgement mechanism to manage acknowledgements (ACKs) to ensure end-to-end consistency between front-end and back-end. For example, when an augmented notification in event data 306 is successfully processed and sent to one or more connected UI clients via UI 110, notification service manager 150 may acknowledge the augmented notification by sending ACKs 322 to a terminal component, such as acknowledge data 320. As another example, when an augmented notification in event data 306 fails to process, notification service manager 150 may negatively acknowledge the augmented notification by sending NACKs 324 to a terminal component, such as acknowledge data 320. As another example, when an augmented notification in event data 306 is discarded by an associated UI client, notification service manager 150 may terminate the augmented notification by sending TERMs 326 to a terminal component, such as acknowledge data 320. Event bus 170 may apply one or more operations using NATS JetStream or Kafka to process acknowledge data 320. In particular, NATS JetStream or Kafka may include one or more client/server libraries that expose some primitives to hand the bus and their messages, such as ACK, NACK, TERM, create streams, create consumers, etc.

In some embodiments, notification service manager 150 may be configured to apply a retry mechanism based on ACKs to ensure end-to-end consistency between front-end and back-end. For example, when an augmented notification in event data 306 is successfully processed and sent to one or more connected UI clients via UI 110, notification service manager 150 may acknowledge the augmented notification by sending ACKs 322 to a terminal component, such as acknowledge data 320. As another example, when an augmented notification in event data 306 fails to process, notification service manager 150 may negatively acknowledge the augmented notification by sending NACKs 324 to a terminal component, such as acknowledge data 320. As another example, when an augmented notification in event data 306 is discarded by an associated UI client, notification service manager 150 may terminate the augmented notification by sending TERMs 326 to a terminal component, such as acknowledge data 320. Event bus 170 may apply one or more operations using NATS JetStream or Kafka NAT to process acknowledge data 320. When errors or exceptions occur during the processing of an event in event data 306, such as in ingress component 302, send component 304, and/or augment component 308, notification service manager 150 may use a retry mechanism to retry the event up to a predetermined threshold, such as MaxRetries 312. For example, the predetermined threshold may be 3 times. In particular, event bus 170 may include a counter for each event that indicates how many times a particular event has been delivered. If this counter does not exceed the predetermined threshold, the event is collected as NACKs 324 to be stored in Event Bus 170 to be processed later, otherwise the event is collected as TERMs 326 to be terminated. Notification service manager 150 may send the events in TERMS 326 to error data 314 which will be sent to the one or more connected UI clients via UI 110. If there are no errors, event data 306 is sent to all connected UI clients via UI 110.

In some embodiments, notification service manager 150 may be configured to implement an acknowledgement mechanism driven by individual UI clients to ensure end-to-end consistency between front-end and back-end. The individual UI clients may be reconnecting UI clients who use UI browsers 346 to implement power saving mechanisms for tabs in the background by disconnecting Web-Sockets and long polling transports. UI 110 may include data processing component 342 to receive data from event data 306 and interact with the UI clients to process the received data. Likewise, UI 110 may include error processing component 344 to handle errors 348 in the received data. For example, a UI client i may successfully receive and display the received data, such as message m. Thus, the UI client i may send an ACK to user data 330 to update a corresponding element in ACKs array 334, such as ACKs[m][i]=1 in ACKs array 334. As another example, the UI client i may fail to receive and display the received data, such as message n. Thus, the UI client i may send a NACK to user data 330 to update a corresponding element in ACKs array 334, such as ACKs[n][i]=0 in ACKs array 334.

In some embodiments, notification service manager 150 may be configured to store the state of a particular client, such as client i, using ACKs array 334. For example, ACKs array 334 may include five elements [1 1 1 1 1] associated with five UI clients for message m. ACKs array 334 of [1 1 1 1 1] indicates that all five UI clients have correctly processed the event with message m, notification service manager 150 may acknowledge the event with message m in ACKs 322 of Acknowledge Data 320. As another example, ACKs array 334 may include another five elements [1 1 0 0 1] associated with the five UI clients for message n. ACKs array 334 of [1 1 0 0 1] indicates that the first, second, and fifth UI clients have correctly processed the event with message n. However, a NACK is received from the third and fourth UI clients. In case a NACK is received, notification service manager 150 may store the corresponding event in time out data 332 and implement send component 304 to resend the message n to the third and fourth UI clients until a predetermined timeout time, such as 60 seconds(s), is reached. In case a UI client, such as the fourth UI client, reaches the predetermined timeout time for message n, notification service manager 150 may delete its corresponding state in ACKs array 334, such ACKs array of [1 1 0 delete (0) 1], which indicates a failure in processing message n for the fourth UI client.

In some embodiments, the timeout mechanism may be used alongside an event bus retention policy to discard old events. This means that events can be discarded from the event bus 170 itself, even if a client has not timed out yet. In this case, notification service manager 150 may send an error event to the UI clients, enabling them to handle the error appropriately, such as displaying an error message. In particular, notification service manager 150 may be deployed using multiple replicas to scale horizontally using ACKs array 334 to store state information for all events which are distributed across all replicas. For example, a Distributed Hash Table (DHT) is used to implement such distributed state across all replicas.

Figure 3B:
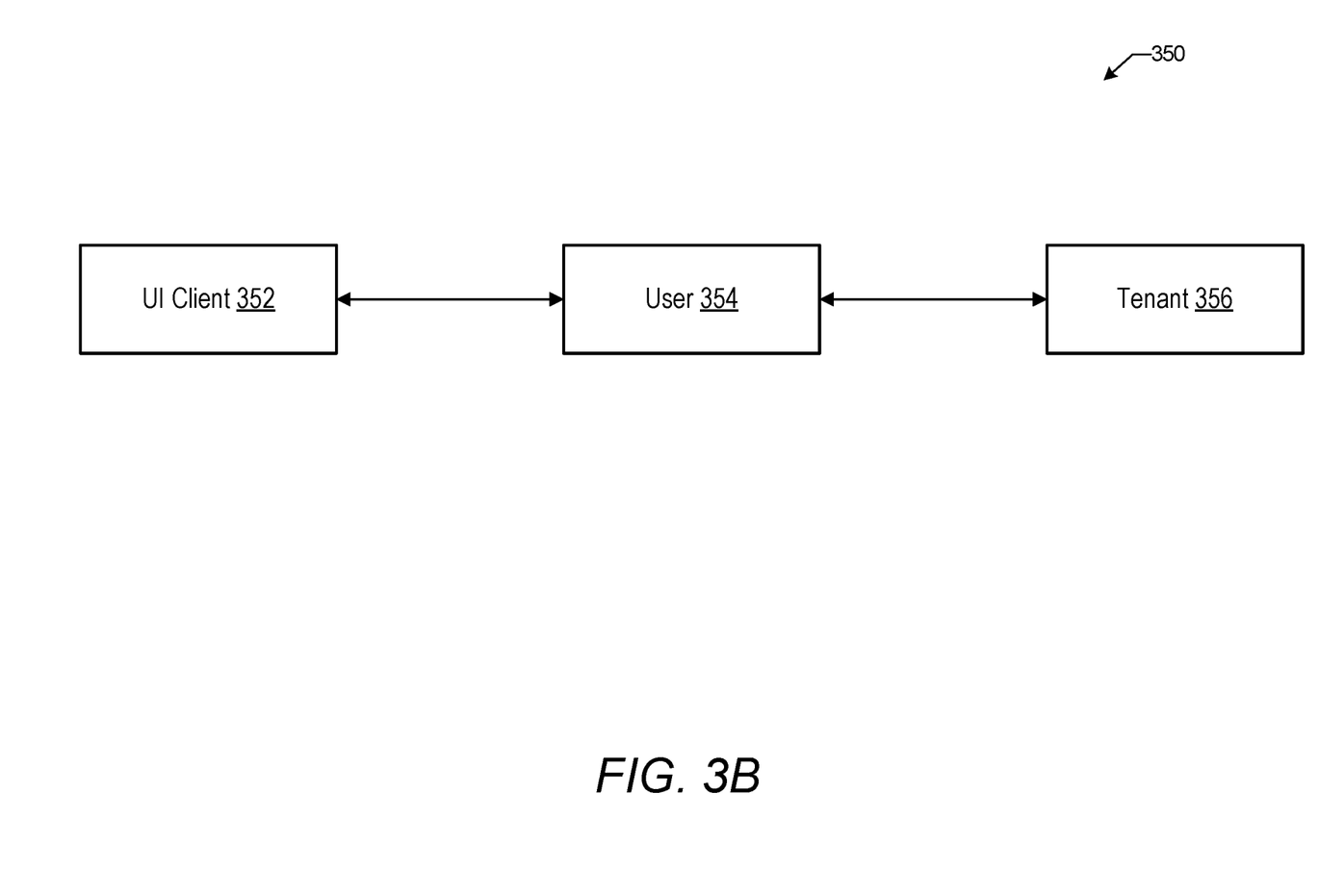
FIG. 3B illustrates an example client in a multi-tenant environment.

FIG. 3B illustrates an example client in a multi-tenant environment 350. A UI client, such UI client 352, is associated with a user, such as user 354, and a tenant, such as tenant 356. Thus, an event may include a user identifier and a tenant identifier. In this case, notification service manager 150 may send data to a particular UI client by matching both the user identifier and the tenant identifier embedded in the incoming event. In this case, notification service manager 150 may send the update to one or more specific UI clients. For example, if a broadcast event is received for all tenants, notification service manager 150 may send the broadcast event to all clients, independently of their tenants.

Although FIGS. 3A and 3B illustrate a particular number of UIs 110, notification service managers 150, databases 160, event buses 170, ingress components 302, send components 304, event data 306, augment components 308, error counts 310, MaxRetries 312, error data 314, acknowledge data 320, ACKs 322, NACKs 324, TERMs 326, user data 330, time out data 332, ACKs arrays 334, REST APIs 340, data processing component 342, error processing components 344, browsers 346, and errors 348, this disclosure contemplates any suitable number of UIs 110, notification service managers 150, databases 160, event buses 170, ingress components 302, send components 304, event data 306, augment components 308, error counts 310, MaxRetries 312, error data 314, acknowledge data 320, ACKs 322, NACKs 324, TERMs 326, user data 330, time out data 332, ACKs arrays 334, REST APIs 340, data processing components 342, error processing components 344, browsers 346, and errors 348.

Although FIGS. 3A and 3B illustrate a particular arrangement of UI 110, notification service manager 150, database 160, event bus 170, ingress component 302, send component 304, event data 306, augment component 308, error count 310, MaxRetries 312, error data 314, acknowledge data 320, ACKs 322, NACKs 324, TERMs 326, user data 330, time out data 332, ACKs array 334, REST APIs 340, data processing component 342, error processing component 344, browsers 346, and errors 348, this disclosure contemplates any suitable arrangement of UI 110, notification service manager 150, database 160, event bus 170, ingress component 302, send component 304, event data 306, augment component 308, error count 310, MaxRetries 312, error data 314, acknowledge data 320, ACKs 322, NACKs 324, TERMs 326, user data 330, time out data 332, ACKs array 334, REST APIs 340, data processing component 342, error processing component 344, browsers 346, and errors 348.

Although FIGS. 3A and 3B describe and illustrate particular components, devices, or systems carrying out particular actions, this disclosure contemplates any suitable combination of any suitable components, devices, or systems carrying out any suitable actions. For example, notification service manager 150 may perform one or more actions of augment component 308.

Figure 4:
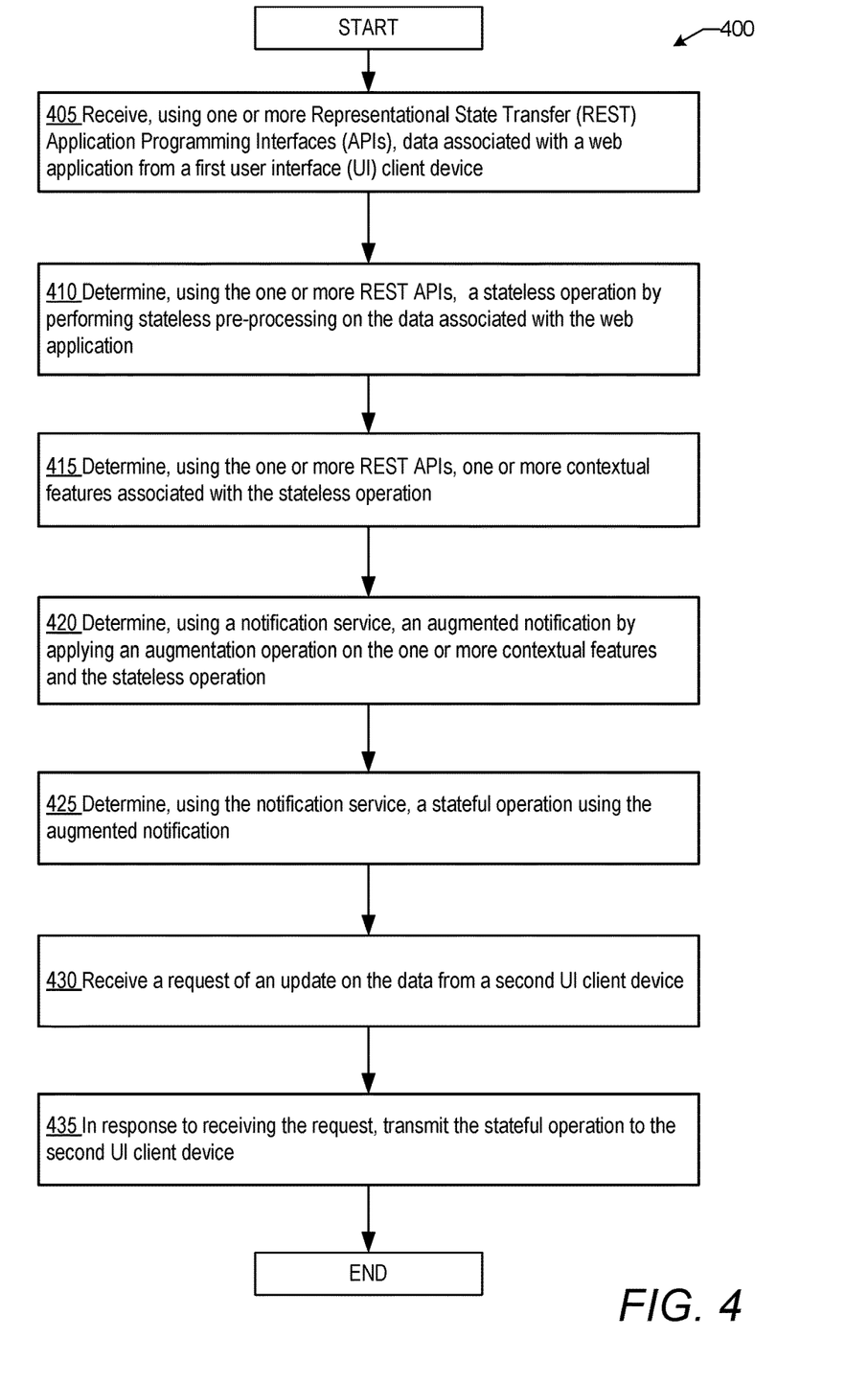
FIG. 4 illustrates an example method for determining an augmented notification using a notification service manager.

FIG. 4 illustrates an example method 400 for determining an augmented notification using a notification service manager 150. Method 400 of FIG. 4 may be used by system 100 of FIG. 1 and system 200 of FIG. 2. Method 400 starts at step 405, where augmented notification service system 100 (referring to FIG. 1) may use one or more REST APIs to receive data associated with a web application from a first UI client device. For example, a first client may provide a data change associated with the web application to augmented notification service system 100 (referring to FIG. 1) from the first UI client device. Augmented notification service system 100 (referring to FIG. 1) may pass quickly and consistently the data change to a plurality of UI clients connected to the system.

At step 410, augmented notification service system 100 (referring to FIG. 1) may use the one or more REST APIs to determine a stateless operation by performing stateless pre-processing on the data associated with the web application. The stateless operation may be a CRUD operation on the data associated with the web application in database 160 (referring to FIG. 1). For example, the stateless operation may be implemented to create a new object for a person with a particular identifier, such as "ID: 550e8400-e29b" for a person with name "John Smith" and Date of Birth of "Jul. 8, 1990."

At step 415, augmented notification service system 100 (referring to FIG. 1) may use the one or more REST APIs to one or more contextual features associated with the stateless operation. The one or more contextual features include business logic information, such as age of the person, which is determined at a service layer of back-end service device 140 (referring to FIG. 1).

At step 420, augmented notification service system 100 (referring to FIG. 1) may determine an augmented notification by applying an augmentation operation on the one or more contextual features and the stateless operation. Notification service system 100 (referring to FIG. 1) may directly access the one or more REST APIs to retrieve the one or more contextual features for a notification of a raw event associated with the stateless operation from back-end service device 140 (referring to FIG. 1). The augmented notification contains basic information, such as an identifier, of the raw event and the one or more contextual features.

At step 425, augmented notification service system 100 (referring to FIG. 1) may determine a stateful operation using the augmented notification. Augmented notification service system 100 (referring to FIG. 1) may use acknowledgements of exchanged notifications to keep the front-end and back-end in sync in order to achieve end-to-end state consistency. The augmented notification is acknowledged when the augmented notification is successfully processed, such as receiving or displaying the received data on the plurality of UI clients connected to the system. The augmented notification is negatively acknowledged when the augmented notification fails to be processed, such as displaying an error message. The augmented notification is terminated when the augmented notification is discarded by an associated UI client device.

At step 430, augmented notification service system 100 (referring to FIG. 1) may receive a request for an update on the data associated with the web application from a second UI client device.

At step 435, in response to receiving the request, augmented notification service system 100 (referring to FIG. 1) may communicate the stateful operation to the second UI client device. In particular, augmented notification service system 100 (referring to FIG. 1) may send the notification resulting from the update request to all connected UI clients, including the originator of the request, such as UI client A 102 (referring to FIG. 1) and UI client B 104 (referring to FIG. 1).

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method to determine an augmented notification using a notification service manager 150 within a distributed environment, including the particular steps of the method of FIG. 4, this disclosure contemplates any suitable method including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
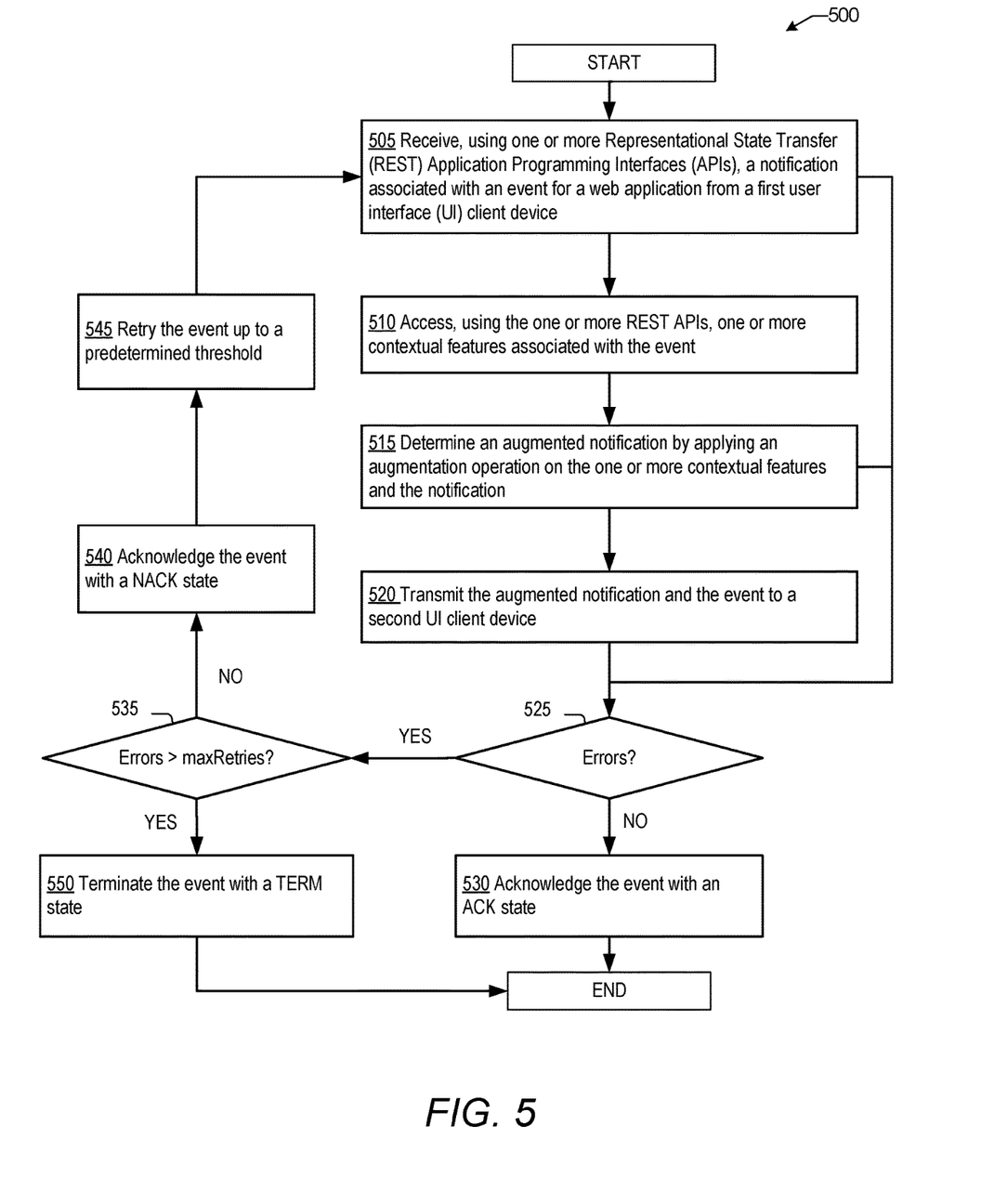
FIG. 5 illustrates an example method for acknowledging an augmented notification using a notification service manager.

FIG. 5 illustrates an example method 500 for acknowledging an augmented notification using a notification service manager 150. Method 500 of FIG. 5 may be used by system 100 of FIG. 1 and system 200 of FIG. 2. Method 500 starts at step 505, where augmented notification service system 100 (referring to FIG. 1) may use one or more REST APIs to receive a notification associated with an event for a web application from a first UI client device. For example, the notification may be trigger when a first client provides a data change associated with the web application to augmented notification service system 100 (referring to FIG. 1) from the first UI client device. As another example, augmented notification service system 100 (referring to FIG. 1) may receive data from event bus 170 (referring to FIG. 1) associated with the event.

At step 510, augmented notification service system 100 (referring to FIG. 1) may use the one or more REST APIs to one or more contextual features associated with the event. For example, the event may be associated with a new object for a person with a particular identifier, such as "ID: 550e8400-e29b" for a person with name "John Smith" and Date of Birth of "Jul. 8, 1990." The one or more contextual features include business logic information, such as age of the person, which is determined at a service layer of back-end service device 140 (referring to FIG. 1).

At step 515, augmented notification service system 100 (referring to FIG. 1) may determine an augmented notification by applying an augmentation operation on the one or more contextual features and the notification. Notification service system 100 (referring to FIG. 1) may directly access the one or more REST APIs to retrieve the one or more contextual features for associated with the event from back-end service device 140 (referring to FIG. 1). The augmented notification contains basic information, such as an identifier, and the one or more contextual features associated with the raw event.

At step 520, augmented notification service system 100 (referring to FIG. 1) may transmit the augmented notification and the event to the second UI client device. The second UI client device may be used by a reconnecting UI client who implements one or more saving mechanisms for tabs in the background. Augmented notification service system 100 (referring to FIG. 1) may implement an acknowledgement mechanism to determine a state of acknowledgement for the event from the second UI client device. For example, the state of acknowledgement is 1 for an ACK state when the second UI client device successfully processes the augmented notification and the event. As another example, the state of acknowledgement is 0 for a NACK state when the second UI client device fails to process the augmented notification and the event with an error or exception.

At step 525, augmented notification service system 100 (referring to FIG. 1) may make a determination whether an error occurs during the processing of the event. For example, the error may include an error occurring in step 505 from an ingress process in charge of receiving data from event bus 170 (referring to FIG. 3A) or REST APIs 340 (referring to FIG. 3A). As another example, the error may include an error occurring in step 515 when to augment the notification. As another example, the error may include an error occurring in step 520 when to transmit the augmented notification and the event to the second UI client device. Where no error occurs during the processing of the event, the process may proceed to step 530. Where an error occurs during the processing of the event, the process may proceed to step 535.

At step 530, augmented notification service system 100 (referring to FIG. 1) may acknowledge the event with an ACK state. In particular, augmented notification service system 100 (referring to FIG. 1) may store the state of acknowledgement for the event from the second UI client device in a corresponding element in an acknowledgement array.

At step 535, augmented notification service system 100 (referring to FIG. 1) may make a determination whether the event needs to be retried. In response to receiving the error, augmented notification service system 100 (referring to FIG. 1) may retry the event up to a predetermined threshold by sending the event to event bus 170 (referring to FIG. 1). Event bus 170 (referring to FIG. 1) may contain a counter for the event that indicates how many times the event has been delivered. Where the event has been retried less than the predetermined threshold, the process may proceed to step 540. Where the event has been retried more than the predetermined threshold, the process may proceed to step 550.

At step 540, augmented notification service system 100 (referring to FIG. 1) may acknowledge the event with a NACK state. Augmented notification service system 100 (referring to FIG. 1) may store the state of acknowledgement for the event from the second UI client device in a corresponding element in an acknowledgement array. Augmented notification service system 100 (referring to FIG. 1) may apply a timeout mechanism to resend the augmented notification and the event to the second UI client device to update the state of acknowledgement within a predetermined timeout threshold. In particular, augmented notification service system 100 (referring to FIG. 1) may delete the state of acknowledgement in the acknowledgement array when the state of acknowledgement is 0 after the second UI device timeouts. Thus, augmented notification service system 100 (referring to FIG. 1) may apply the timeout mechanism with an event bus retention policy to discard the event.

At step 545, augmented notification service system 100 (referring to FIG. 1) may retry the event up to a predetermined threshold. In particular, the event may be kept in event bus 170 (referring to FIG. 1) to be processed later.

At step 550, augmented notification service system 100 (referring to FIG. 1) may terminate the event with a TERM state.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method to determine an augmented notification using a notification service manager 150 within a distributed environment, including the particular steps of the method of FIG. 5, this disclosure contemplates any suitable method including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
one or more processors; and
one or more computer-readable non-transitory storage media comprising instructions that, when executed by the one or more processors, cause one or more components of the apparatus to perform operations comprising:
receiving, using one or more Representational State Transfer (REST) Application Programming Interfaces (APIs), data associated with a web application from a first user interface (UI) client device;
determining, using the one or more REST APIs, a stateless operation by performing stateless pre-processing on the data associated with the web application;
determining, using the one or more REST APIs, one or more contextual features associated with the stateless operation;
determining, using a notification service, an augmented notification by applying an augmentation operation on the one or more contextual features and the stateless operation;
determining, using the notification service, a stateful operation using the augmented notification;

receiving a request for an update on the data associated with the web application from a second UI client device; and in response to receiving the request, communicating the stateful operation to the second UI client device.

2. The apparatus of claim 1, the operations further comprising:

accessing, using a back-end service, data persisted in a database, wherein the back-end service is implemented as microservices and scaled horizontally.

3. The apparatus of claim 1, wherein the second UI client device is the first UI client device.

4. The apparatus of claim 1, the operations further comprising:

directly accessing, using the notification service, the one or more REST APIs internally when multiple clients are connected to the apparatus.

5. The apparatus of claim 1, the operations further comprising:

applying, using the notification service, a retry mechanism to return data when no errors occur in an event associated with the augmented notification received from an event bus and later processed, wherein the retry mechanism comprises a counter for the event that indicates a number of times the event has been delivered.

6. The apparatus of claim 5, the operations further comprising:

applying, using the notification service, an ingress process to receive information associated with the one or more contextual features from the event bus.

7. The apparatus of claim 1, the operations further comprising:

acknowledging, using the notification service, the augmented notification when the augmented notification is successfully processed;

negatively acknowledging, using the notification service, the augmented notification when the augmented notification fails to be processed; or terminating, by the notification service, the augmented notification when a corresponding event associated with the augmented notification has been processed by the notification service more than a predetermined threshold.

8. The apparatus of claim 7, the operations further comprising:

communicating, using the notification service, subsequent updates on the data associated with the web application to all connected client devices when the augmented notification is successfully processed.

9. A computer-implemented method, comprising:

receiving, using one or more Representational State Transfer (REST) Application Programming Interfaces (APIs), data associated with a web application from a first user interface (UI) client device;

determining, using the one or more REST APIs, a stateless operation by performing stateless pre-processing on the data associated with the web application;

determining, using the one or more REST APIs, one or more contextual features associated with the stateless operation;

determining, using a notification service, an augmented notification by applying an augmentation operation on the one or more contextual features and the stateless operation;

determining, using the notification service, a stateful operation using the augmented notification;

receiving a request for an update on the data associated with the web application from a second UI client device; and in response to receiving the request, communicating the stateful operation to the second UI client device.

10. The computer-implemented method of claim 9, further comprising:

accessing, using a back-end service, data persisted in a database, wherein the back-end service is implemented as microservices and scaled horizontally.

11. The computer-implemented method of claim 9, wherein the second UI client device is the first UI client device.

12. The computer-implemented method of claim 9, further comprising:

directly accessing, using the notification service, the one or more REST APIs internally when multiple clients are connected to the notification service.

13. The computer-implemented method of claim 9, further comprising:

applying, using the notification service, a retry mechanism to return data when no errors occur in an event associated with the augmented notification received from an event bus, wherein the retry mechanism comprises a counter for the event that indicates a number of times the event has been delivered.

14. The computer-implemented method of claim 13, further comprising:

applying, using the notification service, an ingress process to receive information associated with the one or more contextual features from the event bus.

15. The computer-implemented method of claim 9, further comprising:

acknowledging, using the notification service, the augmented notification when the augmented notification is successfully processed;

negatively acknowledging, using the notification service, the augmented notification when the augmented notification fails to be processed; or terminating, by the notification service, the augmented notification when a corresponding event associated with the augmented notification has been processed by the notification service more than a predetermined threshold.

16. The computer-implemented method of claim 15, further comprising:

communicating, using the notification service, subsequent updates on the data associated with the web application to all connected client devices when the augmented notification is successfully processed.

17. One or more computer-readable non-transitory storage media embodying instructions that, when executed by a processor, cause the processor to perform operations comprising:

receiving, using one or more Representational State Transfer (REST) Application Programming Interfaces (APIs), data associated with a web application from a first user interface (UI) client device;

determining, using the one or more REST APIs, a stateless operation by performing stateless pre-processing on the data associated with the web application;

determining, using the one or more REST APIs, one or more contextual features associated with the stateless operation;

determining, using a notification service, an augmented notification by applying an augmentation operation on the one or more contextual features and the stateless operation;

determining, using the notification service, a stateful operation using the augmented notification;

receiving a request for an update on the data associated with the web application from a second UI client device; and in response to receiving the request, communicating the stateful operation to the second UI client device.

18. The one or more computer-readable non-transitory storage media of claim 17, the operations further comprising:

accessing, using a back-end service, data persisted in a database, wherein the back-end service is implemented as microservices and scaled horizontally.

19. The one or more computer-readable non-transitory storage media of claim 17, wherein the second UI client device is the first UI client device.

20. The one or more computer-readable non-transitory storage media of claim 17, the operations further comprising:

directly accessing, using the notification service, the one or more REST APIs internally when multiple clients are connected to the notification service.

* * * * *